US011611784B2

(12) United States Patent
Tsin

(10) Patent No.: US 11,611,784 B2
(45) Date of Patent: Mar. 21, 2023

(54) SYSTEM AND METHOD FOR TRANSFERRING LARGE VIDEO FILES WITH REDUCED TURNAROUND TIME

(71) Applicant: Dao Lab Limited, Hong Kong (HK)

(72) Inventor: Hon Kit Tsin, Hong Kong (HK)

(73) Assignee: Dao Lab Limited, Hong Kong (HK)

( * ) Notice: Subject to any disclaimer, the term of this patent is extended or adjusted under 35 U.S.C. 154(b) by 45 days.

(21) Appl. No.: 16/529,858

(22) Filed: Aug. 2, 2019

(65) Prior Publication Data
US 2021/0037275 A1 Feb. 4, 2021

(51) Int. Cl.
H04N 21/2343 (2011.01)
H04N 21/234 (2011.01)
H04L 65/75 (2022.01)

(52) U.S. Cl.
CPC ... *H04N 21/234309* (2013.01); *H04L 65/764* (2022.05); *H04N 21/23406* (2013.01); *H04N 21/234345* (2013.01)

(58) Field of Classification Search
CPC ..... H04N 21/234309; H04N 21/23406; H04N 21/234345; H04L 29/06496
See application file for complete search history.

(56) References Cited

U.S. PATENT DOCUMENTS

| 7,929,844 B2 * | 4/2011 | Barletta ............... G11B 27/005 386/350 |
| 8,695,048 B1 * | 4/2014 | Kellicker ........... H04N 21/2355 725/91 |
| 9,860,569 B1 * | 1/2018 | Wilms ............. H04N 21/23418 |

| 2007/0230579 A1 * | 10/2007 | Shen ...................... H04N 19/42 375/240.16 |

(Continued)

FOREIGN PATENT DOCUMENTS

| CN | 101098483 A | 1/2008 |
| CN | 101616327 A | 12/2009 |

(Continued)

OTHER PUBLICATIONS

Li, "Performance Analysis and Modeling of Video Transcoding Using Heterogeneous Cloud Services", Sep. 2016.*
Paakkonen "Online Architecture for predicting live video transcoding resources", Jul. 2019, Spring Publishing, Journal of Cloud Computing.*

(Continued)

*Primary Examiner* — Todd L Barker

(57) ABSTRACT

Embodiments of the present disclosure provide methods, systems and computer program products for transfer of video signals at a destination with reduced turnaround time. According to one embodiment, a method includes performing transfer of a series of video chunks of a video signal, each video chunk of the series of video chunks comprising a sequence of video frames, wherein for each video chunk, one or more processors perform a processing cycle comprising: receiving the sequence of video frames from a source; processing the received sequence of video frames to generate a processed sequence of video frames, wherein receiving of a consecutive video chunk of the series of video chunks comprising a consecutive sequence of video frames is initiated simultaneously while initiating said processing of the received sequence of video frames; and transmitting the processed sequence of video frames for consumption at a destination.

20 Claims, 6 Drawing Sheets

(56) References Cited

U.S. PATENT DOCUMENTS

| | | | |
|---|---|---|---|
| 2007/0230586 A1* | 10/2007 | Shen | H04N 19/436 375/240.26 |
| 2010/0049832 A1* | 2/2010 | Peleg | H04N 21/64322 709/219 |
| 2011/0022660 A1* | 1/2011 | Liu | G06F 15/16 709/204 |
| 2013/0276048 A1* | 10/2013 | Krasic | H04N 21/234309 725/116 |
| 2013/0294747 A1 | 11/2013 | Takahashi | |
| 2014/0119457 A1* | 5/2014 | MacInnis | H04N 19/40 375/240.26 |
| 2014/0139733 A1* | 5/2014 | MacInnis | H04N 19/154 348/441 |
| 2014/0258558 A1* | 9/2014 | Lemus | H04L 65/80 709/246 |
| 2015/0236966 A1* | 8/2015 | Francini | H04L 43/0864 370/235 |
| 2015/0244757 A1* | 8/2015 | Zhuang | G06F 9/5066 709/219 |
| 2016/0156948 A1* | 6/2016 | Yang | H04N 19/40 725/116 |
| 2018/0338146 A1* | 11/2018 | John | H04N 19/137 |
| 2018/0368926 A1* | 12/2018 | Wade | A61B 1/00009 |
| 2019/0149859 A1* | 5/2019 | George | H04N 21/8547 725/148 |
| 2019/0208241 A1* | 7/2019 | Kandov | H04N 21/234309 |

FOREIGN PATENT DOCUMENTS

| | | |
|---|---|---|
| CN | 105578205 A | 5/2016 |
| CN | 106686406 A | 5/2017 |

OTHER PUBLICATIONS

Gao et al., Dynamic Priority-Based Resource Provisioining for Video Transcoding with Heterogeneous QoS, IEEE Transactions on Circuits and Systems for Video Technology, vol. 29, No. 5, May 2018.*

Siekkinen et al., "Optimized Upload Strategies for Live Scalable Video Tranmission from Mobile Devices", IEEE Transaction on Mobile Computing, vol. 16, No. 4, Apr. 2017.*

Huang et al., "On High Efficient Cloud Video Transcoding", 2015 International Symposium on Intelligent Signal Processing and Communication Systems (ISPACS), Nov. 9, 2015.*

Siekkinen et al., "Exploring the delay versus quality tradeoff in real-time streaming of scalable video from mobile devices", 2015 IEEE International Conference on Multimedia & Expo Workshops (ICMEW) ,Jun. 29, 2015.*

The Combined Search and Examination Report of counterpart British patent application No. 1911041.0 dated Jan. 27, 2020.

Further Examination Report of Counterpart British Patent Application No. 1911041.0 dated Apr. 8, 2022.

* cited by examiner

SYSTEM AND METHOD FOR TRANSFERRING LARGE VIDEO FILES WITH REDUCED TURNAROUND TIME

TECHNICAL FIELD

The present disclosure relates generally to processing and communication of video signals, more particularly the present disclosure provides methods, systems and computer program products for transfer of video signals at a destination with reduced turnaround time.

BACKGROUND

Video and multimedia entertainment has seen a major shift in paradigm, from linear format to Video on demand (VoD) format. The linear format is a pre-programmed timetable broadcast that presents certain content at a certain time of day, whereas the VoD format allows a viewer to interactively choose what content to view at what time. Thus, VOD offers significantly better flexibility and a much wider choice, which makes to become a main paradigm in video entertainment by rapidly taking over the linear format. As VOD content is often consumed through a multitude of interactive devices such as smart phone, set-top-boxes, tablet, PC and smart TVs, etc. each user can view different content at the same time and also, the same content can be viewed again many times.

In light of above-mentioned advantages, there is an exponential growth in creation of content for VOD. With significant increase in video content being produced and consumed, time to prepare video in a way as to take them from a studio output format to various formats and sizes that are suitable for various types of devices become critical for success of a video business. Thus, there is a growing demand for a solution that can produce videos in a consumer ready format in the shortest possible time within a reasonable marginal cost. Further, speed for transfer of video content also varies as farther the distance of a source from a destination; the lower would be the speed, which a computer network can support for transfer of files. As a result, growing cloud computing environment encounters a big challenge in handling transfer of large amount of video content from customer's location to a remote cloud processing environment and vice versa.

Therefore, there is a need in the art for techniques to overcome above-mentioned and other disadvantages of existing systems and also provide enhanced performance and reliability with reduced turnaround time.

SUMMARY

Embodiments of the present disclosure provide methods, systems and computer program products for transfer of video signals, for example video signals of large video files at a destination with reduced turnaround time. The video signals may either originate from a file stored on a computer storage or from a continuous source that produces a stream of video such as live video signals.

According to an aspect of the present disclosure, a method includes performing, by one or more processors of a computing device, transfer of a series of video chunks of a video signal, each video chunk of the series of video chunks comprising a sequence of video frames, wherein for each video chunk, the one or more processors perform a processing cycle comprising: receiving the sequence of video frames from a source; processing the received sequence of video frames to generate a processed sequence of video frames, wherein receiving of a consecutive video chunk of the series of video chunks comprising a consecutive sequence of video frames is initiated simultaneously while initiating said processing of the received sequence of video frames; and transmitting the processed sequence of video frames for consumption at a destination.

In an embodiment, the video signal is divided into the series of video chunks so that each video chunk comprises the sequence of video frames of equal length.

In an embodiment, time of processing of the sequence of video frames overlaps with time of receiving the consecutive sequence of video frames.

In an embodiment, on receiving the consecutive sequence of video frames, said consecutive sequence of video frames is processed in accordance with the processing cycle.

In an embodiment, time of transmitting of the sequence of video frames overlaps with time of processing of the consecutive sequence of video frames.

In an embodiment, the processing of the sequence of video frames comprises transcoding of the sequence of video frames.

In an embodiment, the receiving comprises uploading and transfer of the sequence of video frames from the source to a location for processing.

In an embodiment, the transmitting comprises any or a combination of downloading and streaming of the processed sequence of video frames at the destination.

In an embodiment, the sequence of video frames is transferred for consumption in a Video-on-Demand (VoD) service.

According to another aspect of the present disclosure, a system comprises one or more processors of a computing device; and a memory coupled to the one or more processors and comprising computer readable program code embodied in the memory that is executable by the processor to perform transfer of a series of video chunks of a video signal, each video chunk of the series of video chunks comprising a sequence of video frames, wherein for each video chunk the one or more processors perform a processing cycle comprising: receiving the sequence of video frames from a source; processing the received sequence of video frames to generate a processed sequence of video frames, wherein receiving of a consecutive video chunk of the series of video chunks comprising a consecutive sequence of video frames is initiated simultaneously while initiating said processing of the received sequence of video frames; and transmitting the processed sequence of video frames for consumption at a destination.

According to yet another aspect of the present disclosure, a computer program product, comprises a non-transitory computer readable storage medium comprising computer readable program code embodied in the medium that is executable by one or more processors of a computing device to perform transfer of a series of video chunks of a video signal, each video chunk of the series of video chunks comprising a sequence of video frames, wherein for each video chunk the one or more processors perform a processing cycle comprising: receiving the sequence of video frames from a source; processing the received sequence of video frames to generate a processed sequence of video frames, wherein receiving of a consecutive video chunk of the series of video chunks comprising a consecutive sequence of video frames is initiated simultaneously while initiating said processing of the received sequence of video frames; and transmitting the processed sequence of video frames for consumption at a destination.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
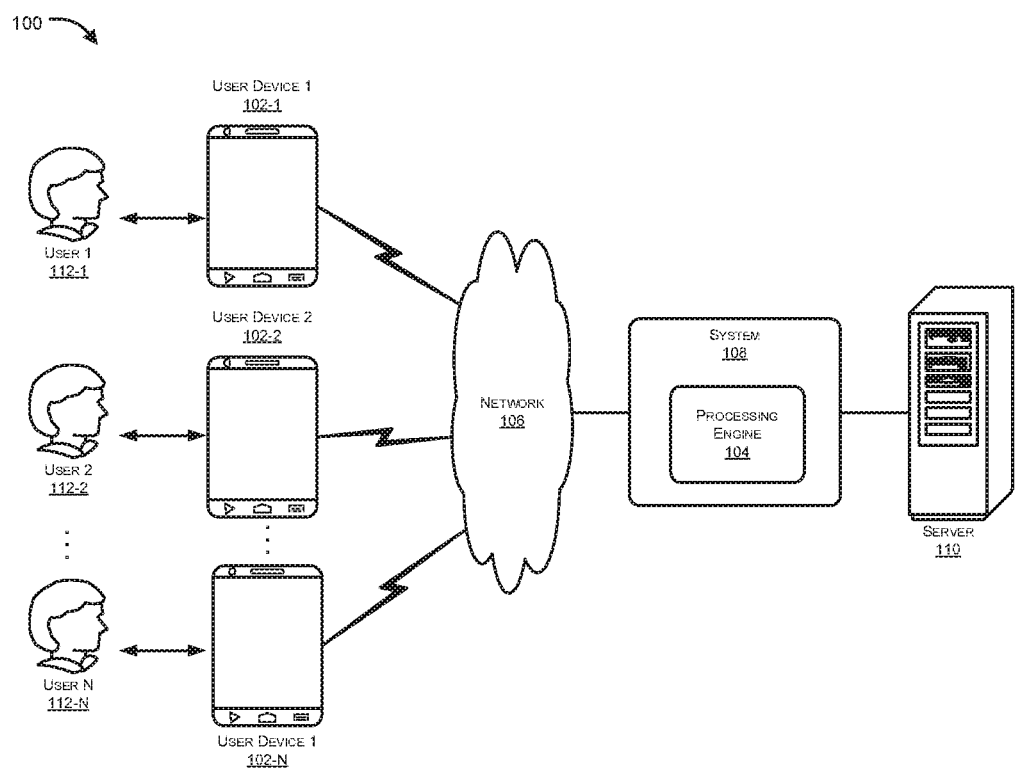
FIG. 1 indicates a network implementation of a system for transferring a video file to one or more user devices in accordance with an embodiment of the present disclosure.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

Embodiments of the present disclosure provide methods, systems and computer program products, which substantially reduce total turnaround time to upload, process and download large video files. Embodiments herein disclose a group of mutually overlapping processes according to which, whenever there is any idle waiting time that requires a certain process to wait, another process may utilize available processing time for other purposes. By carefully and systematically orchestrating a repetitive cycle of processing and idling in an overlapping manner, the total processing time to transfer a large video file can be substantially reduced without additional CPU or hardware. Those skilled in the art would appreciate that in a preferred embodiment, techniques disclosed in the present disclosure can readily be implemented using cloud computing, however, the techniques can equally be implemented using a non-cloud video processing environment.

According to an embodiment, a video file or a video signal may be divided into a series of video chunks such that once a video chunk is uploaded for processing, without waiting for rest of the video chunks of the series of video chunks, which make up the video signal in its entirety, the processing may be initialized for the received video chunk. Embodiments of the present disclosure provide a systematic division of processing of one single large video file into multiple, repetitive processing cycles of smaller files (or chunks). To provide clarity, considering time to transfer entire video signal to be TF, and where the video signal may be divided into N equal size video chunks, the transfer time for each video chunk may be approximately TF/N. Therefore, according to embodiments of the present disclosure, the total time for transferring each video chunk may be TF/N+TX where TX refers to time taken for extraction of the video chunk from the original video file. Further, each processing cycle partially overlaps with a consecutive processing cycle without requiring extra processing power. Multiple smaller files may be transferred with partial overlapping during certain processes instead of sequential transfer, thereby saving significant amount of time.

Embodiments of the present disclosure provide methods, systems and computer program products for transfer of video signals, for example video signals of large video files at a destination with reduced turnaround time. The video signals may either originate from a file stored on a computer storage or from a continuous source that produce a stream of video such as a live video signals.

According to an aspect of the present disclosure, a method includes performing, by one or more processors of a computing device, transfer of a series of video chunks of a video signal, each video chunk of the series of video chunks comprising a sequence of video frames, wherein for each video chunk the one or more processors perform a processing cycle comprising: receiving the sequence of video frames from a source; processing the received sequence of video frames to generate a processed sequence of video frames, wherein receiving of a consecutive video chunk of the series of video chunks comprising a consecutive sequence of video frames is initiated simultaneously while initiating said processing of the received sequence of video frames; and transmitting the processed sequence of video frames for consumption at a destination.

In an embodiment, the video signal is divided into the series of video chunks so that each video chunk comprises the sequence of video frames of equal length.

In an embodiment, time of processing of the sequence of video frames overlaps with time of receiving the consecutive sequence of video frames.

In an embodiment, on receiving the consecutive sequence of video frames, said consecutive sequence of video frames is processed in accordance with the processing cycle.

In an embodiment, time of transmitting of the sequence of video frames overlaps with time of processing of the consecutive sequence of video frames.

In an embodiment, the processing of the video frame comprises transcoding of the sequence of video frames.

In an embodiment, the receiving comprises uploading and transfer of the sequence of video frames frame from the source to a location for processing.

In an embodiment, the transmitting comprises any or a combination of downloading and streaming of the processed sequence of video frames at the destination.

In an embodiment, the sequence of video frames is transferred for consumption in a Video-on-Demand (VoD) service.

According to another aspect of the present disclosure, a system comprises one or more processors of a computing device; and a memory coupled to the one or more processors and comprising computer readable program code embodied in the memory that is executable by the processor to perform transfer of a series of video chunks of a video signal, each video chunk of the series of video chunks comprising a sequence of video frames, wherein for each video chunk the one or more processors perform a processing cycle comprising: receiving the sequence of video frames from a source; processing the received sequence of video frames to generate a processed sequence of video frames, wherein receiving of a consecutive video chunk of the series of video chunks comprising a consecutive sequence of video frames is initiated simultaneously while initiating said processing of the received sequence of video frames; and transmitting the processed sequence of video frames for consumption at a destination.

According to yet another aspect of the present disclosure, a computer program product, comprises a non-transitory computer readable storage medium comprising computer readable program code embodied in the medium that is executable by one or more processors of a computing device to perform transfer of a series of video chunks of a video signal, each video chunk of the series of video chunks comprising a sequence of video frames, wherein for each video chunk the one or more processors perform a processing cycle comprising: receiving the sequence of video frames from a source; processing the received sequence of video frames to generate a processed sequence of video frames, wherein receiving of a consecutive video chunk of the series of video chunks comprising a consecutive sequence of video frames is initiated simultaneously while initiating said processing of the received sequence of video frames; and transmitting the processed sequence of video frames for consumption at a destination.

FIG. 1 indicates a network implementation 100 of a system for transferring a video file to one or more user devices in accordance with an embodiment of the present disclosure.

In an aspect, a system 108 implemented in any computing, gateway or network device can be configured/operatively connected with a server 110. Further, multiple users 112-1, 112-2 . . . 112-N (which are collectively referred to as users 112 and individually referred to as the user 112, hereinafter) can communicate with the system 108 through one or more user devices 102-1, 102-2 . . . 102-N (which are collectively referred to as user devices 102, hereinafter) that can be communicatively coupled to the system 108 through a network 106. The user devices 102 can include a variety of computing systems, including but not limited to, a laptop computer, a desktop computer, a notebook, a workstation, a portable computer, a personal digital assistant, a handheld device and a mobile device. Further, the network 106 can be a wireless network, a wired network or a combination thereof. The network 106 can be implemented as one of the different types of networks, such as intranet, local area network (LAN), wide area network (WAN), the internet, Wi-Fi, LTE network, CDMA network, and the like. Further, the network 106 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 can include a variety of network devices, including routers, bridges, servers, computing devices, storage devices, and the like.

In an aspect, the system 108 can receive a video file or a video signal from the server 110 using HTTP. Further, processing engine 104 of the system 108 can be configured to process the received video file to generate a processed video file and transmit the processed video file to the user device 102 for its intended use. The video file include streaming content pertaining to live videos that is required to be delivered to the user devices 102, alternately, the video file can also include the video file stored on the server 110. Though embodiments of the present disclosure are explained using transfer of the video file from the server 110 to the user device 102, a person skilled in the art would appreciate that the transfer of video file from one user device 102 to another is also well within the scope of the present disclosure.

According to an aspect, a video signal or the video file may be divided into sequences video frames of equal length, each sequence of video frame forming part of a video chunk so that the system 106 may transfer series of video chunks of a video signal from source e.g. server 110 to destination i.e. user device 102. For each video chunk i.e. for each sequence of video frames one or more processors of processing engine 104 may perform a processing cycle. The processing cycle may include receiving the sequence of video frames from the server 110, processing (e.g. transcoding) the received sequence of video frames to generate a processed sequence of video frames, and transmitting the processed sequence of video frames for consumption at the user device 102. However, it should be appreciated that the processing cycles of consecutive video chunks may overlap as receiving of a consecutive video chunk (i.e. consecutive sequence of video frames) of the series of video chunks may be initiated simultaneously while initiating the processing of the received sequence of video frames and time of processing of the sequence of video frames overlaps with time of receiving the consecutive sequence of video frames. Further, on receiving the consecutive sequence of video frames, the consecutive sequence of video frames may be processed in accordance with the processing cycle so that time of transmitting of the sequence of video frames may also overlap with time of processing of the consecutive sequence of video frames. The process may continue with next processing cycle for subsequent video chunks or subsequent sequence of video frames. The overlapping is further explained in detail with reference to FIG. 3.

Those skilled in the art would appreciate that the receiving may include uploading and transfer of the sequence of video frames from the server 110 to processing engine 104 and similarly, the transmitting may include downloading and streaming of the processed sequence of video frames at the user device 102. The sequence of video frames may be transferred for consumption in a VoDservice. Further, reduction in turnaround time is achieved by utilizing two key idle times that processing engine 104 would not utilize in standard way of transferring. The idle time may include:

Idle time for compression/transcoding and other CPU intensive processing—This refers to period of time that the processing engine 104 would be lying idle waiting for the entire uploading and transfer of next sequence of video frames for processing. A professional video file of multi Giga byte size may consume a long time for uploading.

Idle time for downloading and streaming while waiting for processing engine 104 to compress and transcode video to its entirety—For professional, long and complex high resolution video, this can take up to hours.

Embodiments of the present disclosure minimizes the idle time by proposing a scheme whereby uploading is performed along with processing due to overlapping processing cycles of consecutive sequences of video frames. Similarly, downloading and streaming of the final result can commence much earlier rather than waiting for the entire file to be processed.

Figure 2:
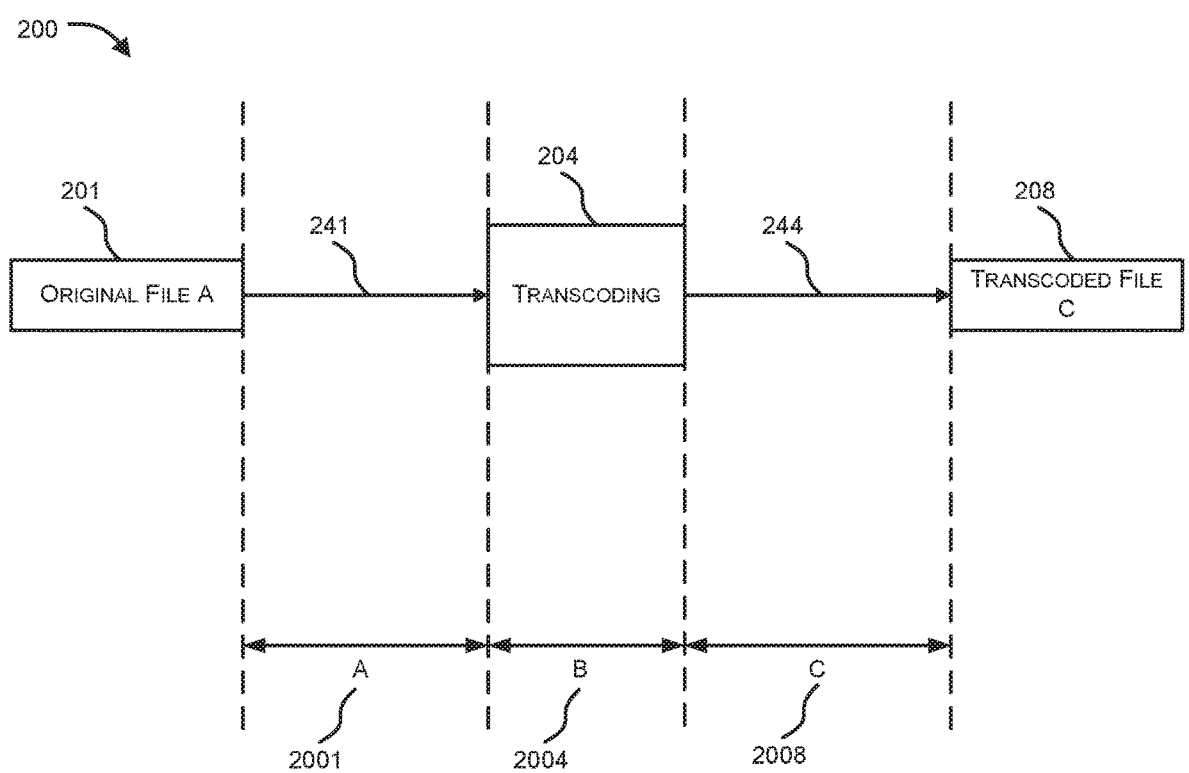
FIG. 2 illustrates an exemplary process, which is commonly deployed in the industry for transfer of a video file for its intended use by a user.

FIG. 2 illustrates an exemplary process 200, which is commonly deployed in the industry for transfer of a video file for its intended use by a user.

In accordance with FIG. 2, a standard sequential transfer of entirety of a video file or a video signal is performed. The process includes receiving of the video file from a source location by a processor, processing performed by the processor and finally transmitting the processed file to a destination location for final storage or consumption. The receiving may include moving or copying of the original video file from a source location i.e. location of creation to a location where processing of the file is performed.

In context of the present example, the process of transfer may start with an original video file A indicated by block 201 that may be used as input for processing by transcoding block 204. The video file 201 in its entirety may be sent from its source location to location of processing by means of any adequate transmission technique such as network transfer indicated as 241. Once the video file 201 is received at location of processing in its entirety, the desired processing may be initiated. The processing may be depicted by transcoding block 204 that may convert the video file 201 from one coding system into another coding system. Further, the processed file e.g. transcoded file C may be transmitted to a destination location indicated by block 208 through a channel 244.

In context of the present example, the total processing time required may be sum of time taken to receive the original file 201 from its source location to the location for processing indicated as A 2001, time taken for processing indicated as B 2004 and time taken to transmit the processed file to the destination location suitable for consumption indicated as C 2008. Thus, the total time may be A+B+C.

Those skilled in the art would appreciate that, though embodiments of the present disclosure are explained using transcoding, however, this does not limit the scope of the present disclosure in any manner and the processing may include any kind of processing as long as that process takes time and processing power. For example, processing may include scanning of video for scene detection, processing of audio, conversion of video subtitles, etc.

Figure 3:
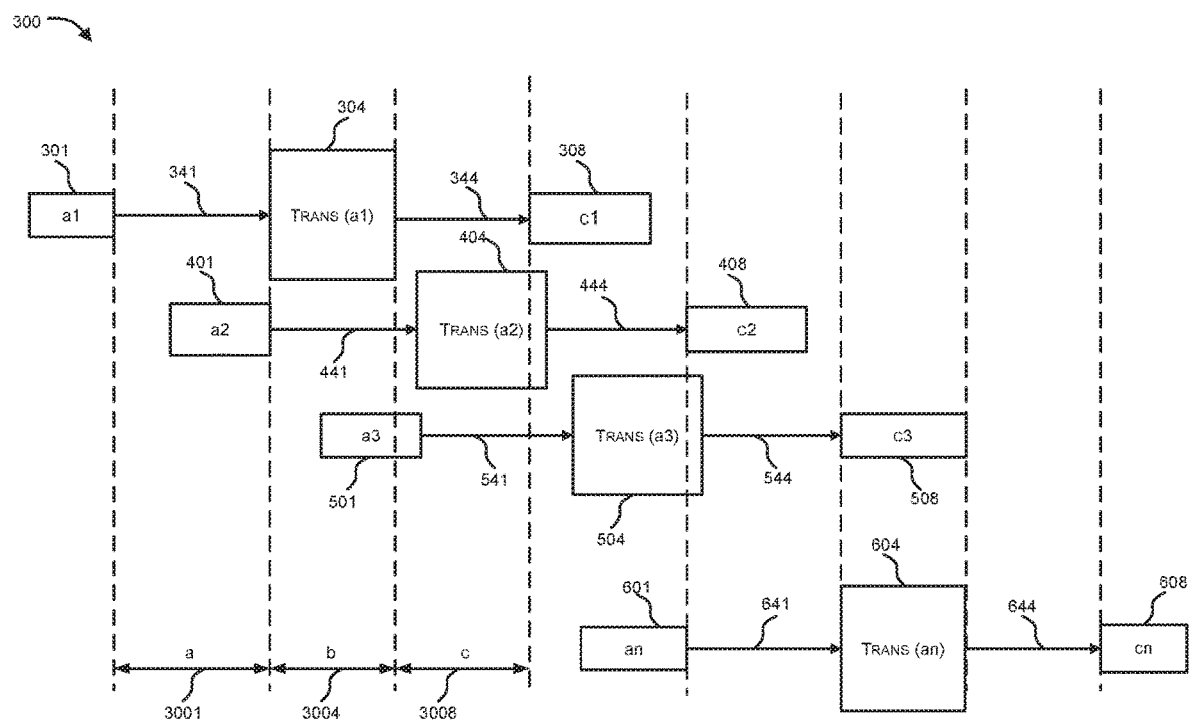
FIG. 3 illustrates an exemplary process for transfer of a video file for its intended use by a user in accordance with an embodiment of the present disclosure.

FIG. 3 illustrates an exemplary process 300 for transfer of a video file for its intended use by a user in accordance with an embodiment of the present disclosure.

In context of the present example, process 300 illustrates multiple overlapping processes in accordance with various embodiments of the present disclosure. According to an embodiment, an original file or a video signal may be divided into a series of smaller video files or video chunks (also referred to as "Chunks", hereinafter). Thus, the original video file may break up into smaller processing sequence that resembles the original sequential processing 200. However, multiple of small processing sequences may overlap with each other, creating partial parallel processing sequences, which significantly reduces the total time of transfer of the video file.

As illustrated, a video signal or video file may be divided into a series of chunks a1, a2, a3 and so on, therefore, each processing sequence of video frames includes a portion of the video file such that each of these chunks, when combined together as a whole, makes up of the original video file. In context of the present example, each portion a1, a2 et cetera, as indicated by their suffix numbering, indicates relative order of position within the original file. For example, the original file may be divided into a1, a2, a3 and so on such that a1 may represents the beginning portion of the original video file, a2 immediately follows a1 and where a video file is divided into "n" portions, the final portion may be labeled as "an".

According to an embodiment, transfer of each small portion of the original video file, e.g., a1 301 may resemble the process 200 i.e. the conventional sequential processing workflow. In context of the present example, a1 301 may be the first chunk to be received from a source location at a processing location by a processor for processing. The receiving may be performed by a suitable transfer mechanism 341. Once received, a1 301 may be processed represented as Trans(a1) 304. Further, output of Trans(a1) 304 may be c1 308, which may be transmitted using suitable transfer mechanism 344 to a destination location for consumption. Those skilled in the art would appreciate that transfer may be performed using transmission channels formed through any suitable computer network technology.

In context of the present example, total time taken to process and transfer a small chunk a1 may be a (3001)+b (3004)+c (3008). Where a (3001) is time taken to receive the chunk a1 by a processor, which may include time for extraction of a1 from the original video file, b (3004) is time taken for processing of a1 and c (3008) is time taken to transmit c1 308, the output produced from processing in Trans(a1) 304, to the destination for consumption.

In context of the present example, a (3001) may be directly proportional to A (2001) by a factor of N where N equals to factor of division on the original file A 201. For example, if the original file A 201 is divided into two equal size smaller chunks, a1 and a2, then case N is 2, and the duration taken to transfer a1 represented as a (3001) equals to half of A (2001), therefore a=A/2. Similarly, if factor of division is three, meaning the original video file A is divided into 3 equal chunks, a1, a2 and a3, each a1, a2, a3 may incur a transfer time, from its source to the processor for processing, of A/3 accordingly.

In a way similar to the calculation of a=A/N, duration b (3004) may be directly proportional to the duration B (2004). However, as nature of processing may differ, b may not exactly equal B/N, but b may be directly proportional to B/N such that b=B/N+X where X may be a certain positive or negative number depending on type of processing and the different individual realization of those processing theories and principles into actual coding. Similarly, duration c (3008) may be directly proportional to C (2008) and may be equal to C/N when the original file A 201 is divided into N equal smaller size chunks a1, a2, . . . , aN.

According to an embodiment of the present disclosure, the process workflow of a small portion of file a1 301 including receiving by the processor for processing 341, processing 304 for producing processed chunk c1 308 and transmitting c1 308 to destination for consumption 344 may be repeated and partially overlapped by similar workflow. The commencing time of each of the partially overlapped workflow in accordance with process 300 may follow a rule that for when a chunk is received for processing, receiving of a consecutive chunk is initiated simultaneously while initiating processing of the received chunk. For example, starting with the first portion a1 301 being extracted from the original file A 201, by the time a1 is received completely by a processor for processing 304 and when processing starts e.g. Trans(a1) 304, the consecutive chunk of the original file A 201 that immediately follows a1 may be received. In context of the present example, the chunk that immediately follows a1 301 is a2 401, therefore, when a1 is received for processing and when processing of a1 301 is initiated, simultaneously, receiving of a2 401 is also initiated. Further, when a2 401 is received for processing, processing of a2 401 in Trans(a2) 404 is performed, which produces a result c2 408 and c2 408 is transmitted the destination for consumption. When processing of a2 401 i.e. trans (a2) 404 begins, receiving of next chunk i.e. a3 501 also begins simultaneously.

Therefore, according to an embodiment of the present disclosure, each new workflow of $n^{th}$ portion of the original file A 201, may commence with receiving of chunk of file a'n' where n corresponds to 1,2, . . . N when the original file A 201 is divided into N equal portions. Further, workflow for transferring of a"n" where "n" is a positive number greater than 1, for example a2, a3 and so on, may start at the time when a"n−1" received for processing and the corresponding processing begins. For example, for a2 (n=2) the processing cycle starts when a1 301 (n−1) has been received for processing, and when processing of a1 301 i.e. Trans(a1) 304 commences. Similarly, for a3 (n=3) the processing cycle starts when a2 (n−1) has been received for processing and processing of a2 401 i.e. Trans(a2) 404 commences.

Referring to process 300, during the time when a processor is handling the processing of a certain chunk, say a1, as in Trans(a1) 304, the processor would be highly utilized. Whereas during the process of data transfer including receiving of the chunks like a1, a2, from their source location to location for processing, bandwidth of the transfer medium is consumed along with very little consumption of processing power. Since the process of data transfer utilizes different resource of computer networking and do not utilize processing hardware resource, the process of data transfer can overlap with the process of data processing such as those of 441 and 304. During the time when a1 301 is received at location for processing, the resource utilization move to processor centric data processing as in 304, leaving the hardware resource for data transfer idle. As a result, the transfer of the subsequent chunk of file a2 401 may be commenced and a2 401 is transferred to location for processing 441. The overlapping of the time taken for 304 is labeled as b (3004) and b (3004) overlaps with the time taken in 441 i.e. data transfer for a2 401.

Therefore according to an embodiment of the present disclosure transfer of a small chunk a"i+1" may overlap with the processing of the previous chunk a "i", i.e., InputTransfer(a"i+1") overlaps with Processing(a"i") e.g. 441 overlaps with 304. As overlapping operations can take place at the same time, total time consumed can be shortened. Additionally, along with the overlapping as described above, OutputTransfer(a"i") may also overlap with Processing(a"i+1"), for example, 344 can overlap with 404. That is, during the processing of the chunk a"i+1", chunk a"i" has it processing completed and commences data transfer from location of processing to destination location for final data consumption.

In context of the present example, with a division factor of N, N similar overlapping processing cycles including receiving, processing and transmitting are implemented. The total time consumed for implementing N overlapping processing cycles depend on whether the data transfer time takes longer or the processing time takes longer in any of the overlapping processing cycles. The reduction in total time of data transfer is equally applicable whether the data transfer time takes longer or the processing time takes longer.

Those skilled in the art would appreciate that total time taken for transfer of the video file in a conventional, non-overlapping sequential processing is A+B+C=(2001)+

(2004)+(2008). Considering T is the data transfer time any of the a1, . . . , aN and P is the processing time any of the a1, . . . , aN, A=NT, C=NT, B=NP, therefore the total time taken may be 2NT+NP.

According to an example of overlapping processing, where data transfer time may take longer, the total time consumed in the transfer of the video file may be (N+1)T+P. Therefore, the difference indicating reduction in time may be:

$$2NT + NP - (N+1)T - P = 2NT - NT + T + (N-1)P \quad (1)$$
$$= NT + T + (N-1)P$$
$$= (N+1)T + (N-1)P$$

In other words, the total time saved is (N+1)T+(N−1)P. This means nearly half of the total input/output data transfer time and anything between 50% of the total processing time or above, depending on the value of N is saved. Considering, N=2, 50% of the time is saved.

According to another example of overlapping processing, where processing time takes longer, the total time taken may be defined as 2T+NP., Therefore, the difference indicating reduction in time may be:

$$2NT+NP-2T-NP=2NT-2T=2T(N-1) \quad (2)$$

It would be appreciated, in majority cases where original file is large and the original file many equal small chunks through a large division factor N, therefore, the time saving 2NT−2T would be close to the sum of input data transfer and output data transfer time.

Therefore, the above comparisons (1) and (2) indicate that the embodiments of the present disclosure significantly reduce to total data transfer and processing time as compared to conventional methods of non-overlapping sequential processing.

Figure 4:
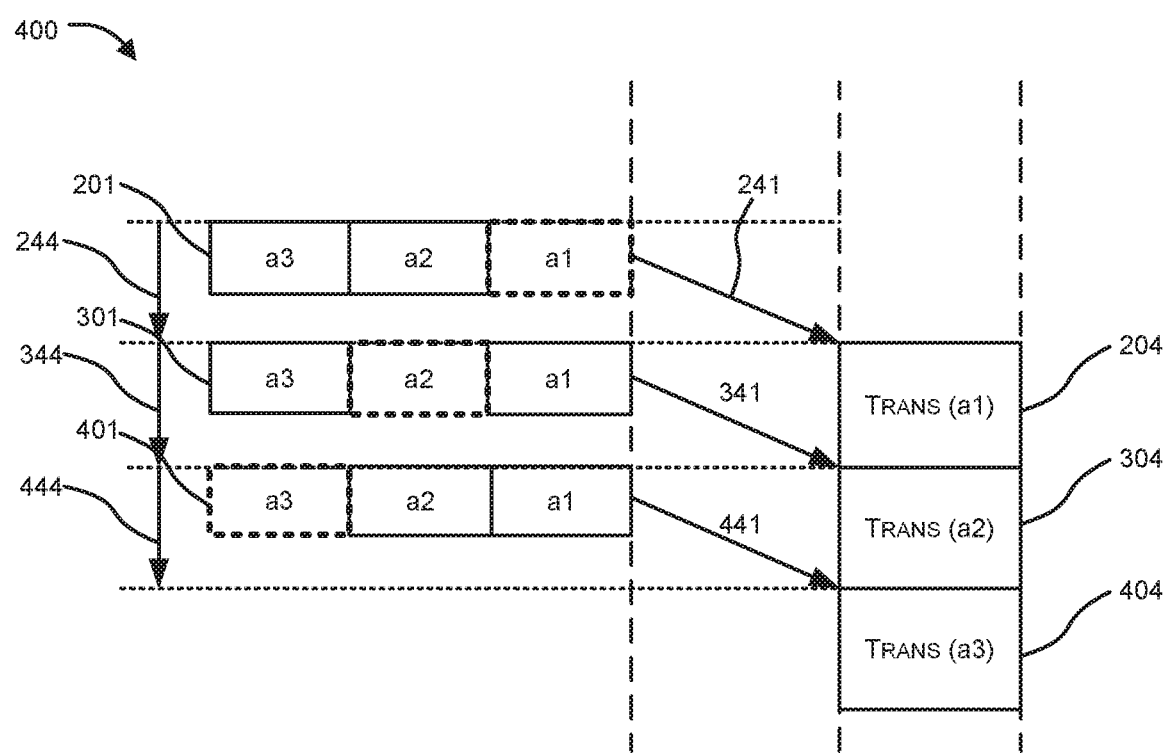
FIG. 4 illustrates an exemplary representation of dividing an original video file into smaller chunks in accordance with an embodiment of the present disclosure.

FIG. 4 illustrates an exemplary representation 400 of dividing an original video file into smaller chunks in accordance with an embodiment of the present disclosure.

To provide clarity, an example with N=3 may be considered. Therefore, the original file may be viewed as including three equal size chunks, a1, a2 and a3 where a1 represents first portion of the file, a2 represents portion immediately following a1 and a3 represents last portion of the file. The order of extraction of a1, a2 and a3 may follow order in which each of these portions reside in the file. For example, always a1 is extracted first as a1 corresponds to beginning of the file. In an implementation, small files a1, a2, . . . , aN may be generated from a large file whereas in another implementation equal number of bytes may be read from the original large file that corresponds to each a1, a2, . . . , aN such that transfer of a bytes stream is performed to for processing or consumption.

Figure 5:
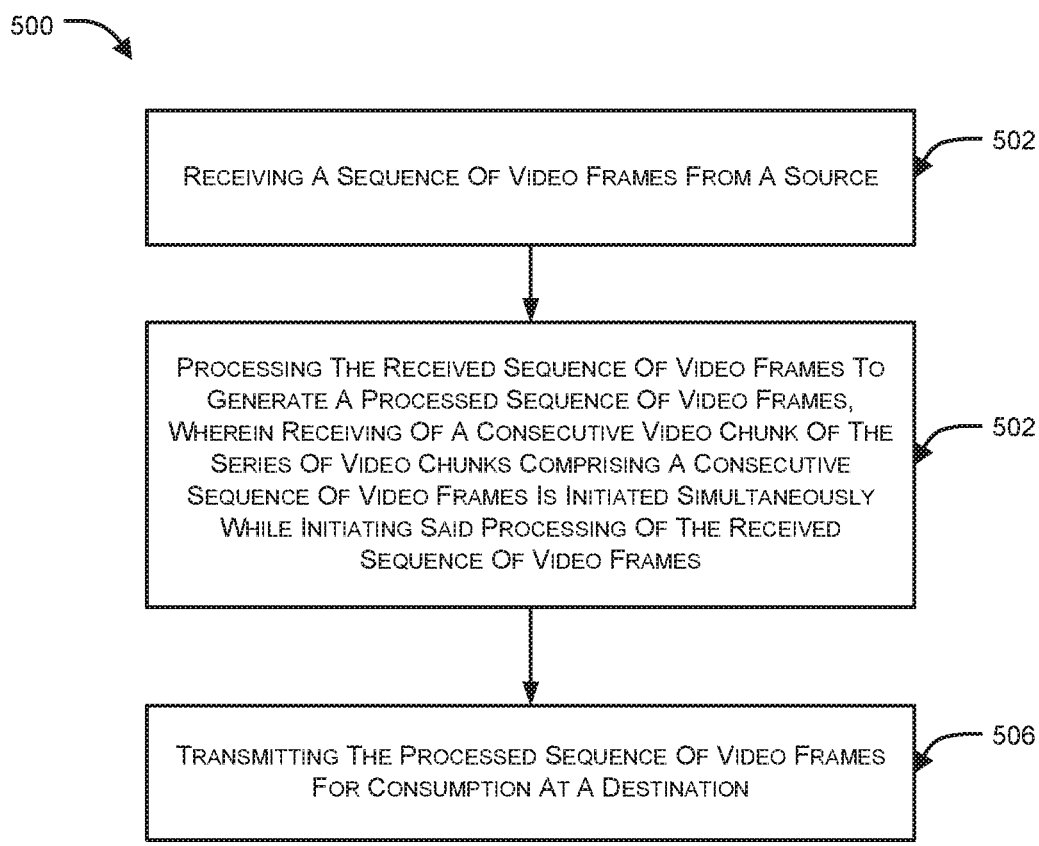
FIG. 5 is a flow diagram illustrating transfer of a video signal in accordance with an embodiment of the present disclosure.

FIG. 5 is a flow diagram 500 illustrating transfer of a video signal in accordance with an embodiment of the present disclosure.

In context of flow diagram 500, one or more processors may perform transfer of series of video chunks of a video signal by performing a processing cycle for each video chunk comprising a sequence of video frames. The processing cycle may include, at block 502, receiving the sequence of video frames from a source and at block 504 processing the received sequence of video frames to generate a processed sequence of video frames, wherein receiving of a consecutive video chunk of the series of video chunks comprising a consecutive sequence of video frames is initiated simultaneously while initiating the processing of the received sequence of video frames so that time of processing of the sequence of video frames overlaps with time of receiving the consecutive sequence of video frames. The method may further include, at block 506 transmitting the processed sequence of video frames for consumption at a destination.

Figure 6:
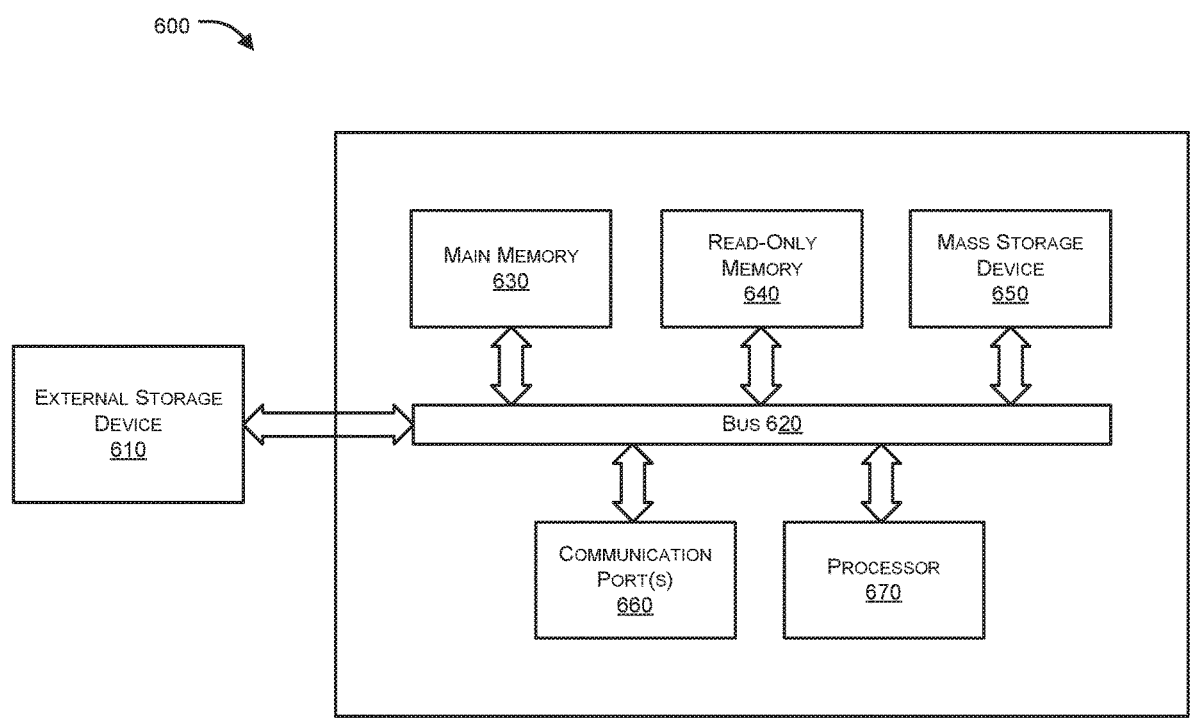
FIG. 6 illustrates an exemplary computer system to implement the proposed system in accordance with embodiments of the present disclosure.

FIG. 6 illustrates an exemplary computer system 600 to implement the proposed system in accordance with embodiments of the present disclosure.

As shown in FIG. 6, computer system can include an external storage device 610, a bus 620, a main memory 630, a read only memory 640, a mass storage device 650, communication port 660, and a processor 670. A person skilled in the art will appreciate that computer system may include more than one processor and communication ports. Examples of processor 670 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 670 may include various modules associated with embodiments of the present invention. Communication port 660 can be any of an RS-232 port for use with a modem based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system connects.

Memory 630 can be Random Access Memory (RAM), or any other dynamic storage device commonly known in the art. Read only memory 640 can be any static storage device(s) e.g., but not limited to, a Programmable Read Only Memory (PROM) chips for storing static information e.g., start-up or BIOS instructions for processor 670. Mass storage 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7102 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 620 communicatively couples processor(s) 670 with the other memory, storage and communication blocks. Bus 620 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 670 to software system.

Optionally, operator and administrative interfaces, e.g. a display, keyboard, and a cursor control device, may also be coupled to bus 620 to support direct operator interaction with computer system. Other operator and administrative interfaces can be provided through network connections connected through communication port 660. External storage device 610 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Embodiments of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

I claim:

1. A method comprising:
performing, by one or more processors of a computing device, transfer of a series of video chunks of a video signal, each video chunk of the series of video chunks comprising a sequence of video frames, wherein for the transfer of each video chunk, the one or more processors perform a processing cycle comprising:
receiving the video chunk from a source;
processing the received video chunk to generate a processed video chunk, wherein the receiving of the consecutive video chunk of the series of video chunks is initiated simultaneously while initiating said processing of the received video chunk, wherein upon completion of the processing of the received video chunk, the processing of the consecutive video chunk is initiated, wherein time for processing and transferring the received video chunk is a sum of a ratio of total processing and transferring time for processing the video signal to a total number of the video chunks, and a real number; and
transmitting the processed video chunk for consumption at a destination;
the processing cycle further comprising:
utilizing idle times to achieve reduction in turnaround time, the idle times comprising:
a first idle time for compression and transcoding and other CPU intensive processing, wherein in the first idle time, the computing device is lying idle waiting for an entire uploading and transfer of next sequence of the video frames for processing;
a second idle time for downloading and streaming while waiting for the computing device to compress and transcode the video signal to its entirety.

2. The method of claim 1, wherein the video signal is divided into the series of video chunks so that each video chunk comprises the sequence of video frames of equal length.

3. The method of claim 1, wherein time of processing of the received video chunk overlaps with time of receiving the consecutive video chunk.

4. The method of claim 1, wherein on receiving the consecutive video chunk, said consecutive video chunk is processed in accordance with the processing cycle.

5. The method of claim 1, wherein time of transmitting of the video chunk overlaps with time of processing of the consecutive video chunk.

6. The method of claim 1, wherein the processing of the video chunk comprises transcoding of the video chunk.

7. The method of claim 1, wherein the receiving comprises uploading and transfer of the video chunk from the source to a location for processing.

8. The method of claim 1, wherein the transmitting comprises any or a combination of downloading and streaming of the processed video chunk at the destination.

9. The method of claim 1, wherein the video chunk is transferred for consumption in a Video-on-Demand (VoD) service.

10. A system, comprising:
one or more processors of a computing device; and
a memory coupled to the one or more processors and comprising computer readable program code embodied in the memory that is executable by the processor to perform transfer of a series of video chunks of a video signal, each video chunk of the series of video chunks comprising a sequence of video frames, wherein for the transfer of each video chunk, the one or more processors perform a processing cycle comprising:

receiving the video chunk from a source;

processing the received video chunk to generate a processed video chunk, wherein the receiving of the consecutive video chunk of the series of video chunk is initiated simultaneously while initiating said processing of the received video chunk, wherein upon completion of the processing of the received video chunk, the processing of the consecutive video chunk is initiated, wherein time for processing and transferring the received video chunk is a sum of a ratio of total processing time for processing and transferring the video signal to a total number of the video chunks, and a real number; and transmitting the processed video chunk for consumption at a destination;

the processing cycle further comprising:

utilizing idle times to achieve reduction in turnaround time, the idle times comprising:

a first idle time for compression and transcoding and other CPU intensive processing, wherein in the first idle time, the computing device is lying idle waiting for an entire uploading and transfer of next sequence of the video frames for processing;

a second idle time for downloading and streaming while waiting for the computing device to compress and transcode the video signal to its entirety.

11. The system of claim 10, wherein the video signal is divided into the series video chunk so that each video chunk comprises the sequence of video frames of equal length.

12. The system of claim 10, wherein time of processing of the received video chunk overlaps with time of receiving the consecutive video chunk.

13. The system of claim 10, wherein on receiving the consecutive video chunk, said consecutive video chunk is processed in accordance with the processing cycle.

14. The system of claim 10, wherein time of transmitting of the video chunk overlaps with time of processing of the consecutive video chunk.

15. The system of claim 10, wherein the processing of video chunk comprises transcoding of the video chunk.

16. The system of claim 10, wherein the receiving comprises uploading and transfer of the video chunk from the source to a location for processing.

17. The system of claim 10, wherein the transmitting comprises any or a combination of downloading and streaming of the processed video chunk at the destination.

18. The system of claim 10, wherein the video chunk is transferred for consumption in a Video-on-Demand (VoD) service.

19. A computer program product, comprising:

a non-transitory computer readable storage medium comprising computer readable program code embodied in the medium that is executable by one or more processors of a computing device to perform transfer of a series of video chunks of a video signal, each video chunk of the series of video chunks comprising a sequence of video frames, wherein for the transfer of each video chunk, the one or more processors perform a processing cycle comprising:

receiving the video chunk from a source;

processing the received video chunk to generate a processed video chunk, wherein the receiving of the consecutive video chunk of the series of video chunks is initiated simultaneously while initiating said processing of the received video chunk, wherein upon completion of the processing of the received video chunk, the processing of the consecutive video chunk is initiated, wherein time for processing and transferring the received video chunk is a sum of a ratio of total processing and transferring time for processing the video signal to a total number of the video chunks, and a real number; and transmitting the processed video chunk for consumption at a destination;

the processing cycle further comprising:

utilizing idle times to achieve reduction in turnaround time, the idle times comprising:

a first idle time for compression and transcoding and other CPU intensive processing, wherein in the first idle time, the computing device is lying idle waiting for an entire uploading and transfer of next sequence of the video frames for processing;

a second idle time for downloading and streaming while waiting for the computing device to compress and transcode the video signal to its entirety.

20. The computer program product of claim 19, wherein time of processing of the received video chunk overlaps with time of receiving the consecutive video chunk.

* * * * *